April 15, 1941.  J. F. SEBALD  2,238,572
FEEDWATER HEATER
Filed Nov. 9, 1939  3 Sheets-Sheet 2

Joseph F. Sebald
INVENTOR
BY *Rob Krieger*
ATTORNEY

April 15, 1941.  J. F. SEBALD  2,238,572
FEEDWATER HEATER
Filed Nov. 9, 1939   3 Sheets-Sheet 3

Joseph F. Sebald
INVENTOR
BY
ATTORNEY

Patented Apr. 15, 1941

2,238,572

UNITED STATES PATENT OFFICE 2,238,572

FEEDWATER HEATER

Joseph F. Sebald, Arlington, N. J., assignor to Worthington Pump and Machinery Corporation, Harrison, N. J., a corporation of Delaware Application November 9, 1939, Serial No. 303,578

7 Claims. (Cl. 261—115)

This invention relates to feedwater heaters and more particularly to feedwater heaters of the direct contact type wherein the water to be heated and the heating steam have direct contact one with the other.

An object of the present invention is to provide a high pressure direct contact, non-deaerating feedwater heater which is simple in construction and consequently relatively inexpensive to manufacture, which heater embodies novel means to provide uniform steam distribution in the heating space of the heater and in which the water to be heated is first sprayed through the heating space in the direction of flow of the steam and subsequently passes on its way to the storage compartment through the heating space countercurrent to the steam flow.

With these and other objects in view, as may appear from the accompanying specification, the invention consists of various features of construction and combination of parts, which will be first described in connection with the accompanying drawings, showing a feedwater heater of the preferred form embodying the invention, and the features forming the invention will be specifically pointed out in the claims.

Figure 2:
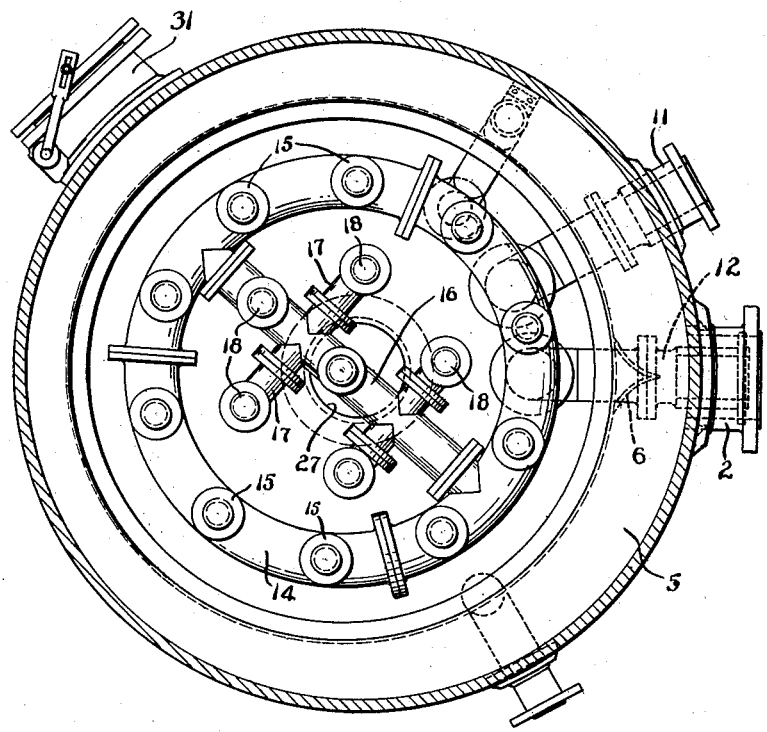
Figure 2 is a cross-section on the line 2—2 of Figure 1.

Referring more particularly to the drawings, the improved feedwater heater comprises a body shell 1, which is preferably cylindrical in shape, but need not necessarily be limited to such shape. The shell 1 has a steam inlet opening 2 therein a short distance downwardly from its upper end and a circular partition 3 is supported within the shell by suitable supports 4, directly inwardly from the steam inlet 2. The circular partition 3 extends longitudinally within the shell and is disposed eccentrically to the inner contour of the shell providing an annular steam space 5 about the partition. The steam space 5 has its greatest cross-sectional area at the part directly inwardly from the steam inlet 2 and gradually decreases in cross-sectional area in both directions from the steam inlet 2 as clearly shown in Figure 2 of the drawings, to provide uniform distribution of steam within the steam space 5. A steam guide 6 in the form of two concave diverging plates is attached to the circular partition 3 with the meeting edges of the plates bisecting the steam inlet for the purpose of directing the steam in both directions within the steam space. A wall 8 is attached to the upper edge of the partition 3 and the inner wall of the shell 1 forming a closure for the top of the steam space so that the steam entering the shell must pass downwardly in the steam space and across the bottom of the circular partition and upwardly into the heating space 9 formed within the enclosure defined by the circular partition 3. If it is so desired a circular flange 10 may be provided on the inner side of the bottom of the partition.

Figure 1:
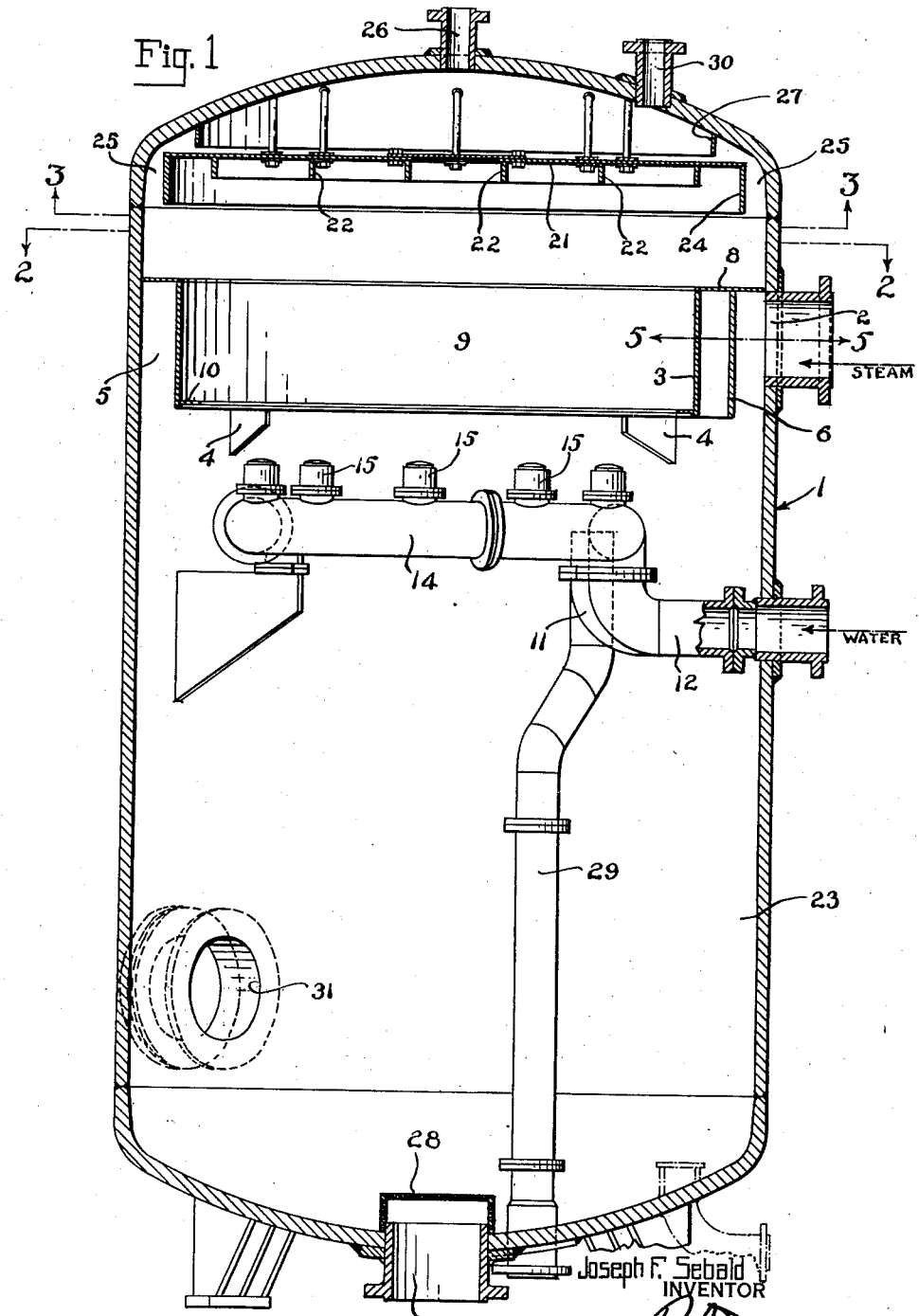
Figure 1 is a vertical section through the improved feedwater heater.

The feedwater to be heated enters the feedwater distributing means through a pair of water inlets 11 and 12 and passes from these inlet pipes 11 and 12 into a distributing ring 14. The ring 14 is positioned below the heating space 9 as clearly shown in Figure 1 of the drawings, and it has a plurality of spray valves 15 spaced at circumferential points around the ring, which spray valves open upwardly under the pressure of incoming water to spray the water to be heated in fine streams upwardly through the heating space or chamber 9. If it is so desired a cross pipe 16 with a plurality of branches 17 may be connected in the water supply ring 14. The cross pipe 16 and branch pipes 17 also carry spray valves 18 for spraying the water upwardly through the heating space or chamber 9.

Figure 4:
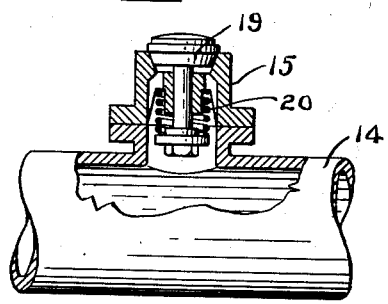
Figure 4 is a detail view in section of a spray valve for spraying the water into the heater.
Figure 3:
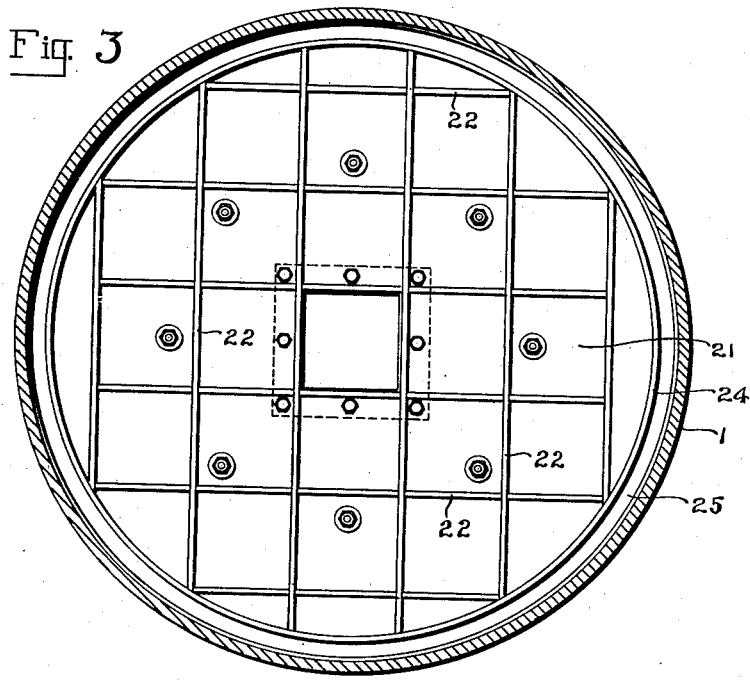
Figure 3 is a cross-section on the line 3—3 of Figure 1.
Figure 5:
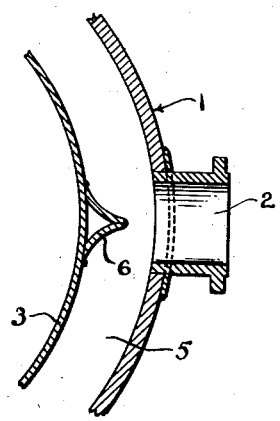
Figure 5 is a detail section on the line 5—5 of Figure 1.

Any approved type of spray valve may be used, and Figure 4 of the drawings shows a spring seated valve 19 which is moved off its seat against the tension of the spring 20 by the pressure of water delivered to the water delivering ring 14.

The water to be heated is sprayed from the spraying valves 15 and 18 upwardly through the heating space 9 in the direction of flow of steam through the heating space where it is heated by direct contact with the steam. The water impinges against a splash plate 21 which is suspended within the heater shell above and in spaced relation to the top of the heating space. The splash plate 21 has a plurality of depending ribs 22 formed thereon or attached thereto which break up the surface of the splash plate contacted by the water into a plurality of pockets, causing the water to be broken up and cascaded downwardly, by gravity, upon the wall 8 and through the heating space 9, where it is further heated by contact with the steam before it falls into the storage compartment 23 in the bottom of the shell 1. The splash plate 21 has its edges spaced inwardly from the inner wall of the shell 1 and it has downwardly extending rim 24 on its edges. The rim 24 projects below the ribs 22 so as to prevent the water falling from the splash plate entering and blocking the space 25 about the splash plate. The annular space 25 forms a passageway for the passage of non-condensable gases and vapors into the top of the shell 1 above the splash plate from which it escapes through the vent 26. A circular baffle plate 27 is suspended from the top of the shell 1 and coacts with the rim 24 and splash plate 21 to form a sinuous path for the non-condensable gases and vapors on their way to the vent 26.

The heated feedwater is withdrawn from the bottom of the shell 1 through an outlet 27, which has a filtering screen 28 thereover. An overflow pipe 29 rises within the shell 1 so as to prevent the rising of the water level in the storage compartment to a height sufficient to cause interference with the incoming water to be heated. If it is so desired, a safety or blow-off valve (not shown) of any suitable type may be connected to the interior of the shell 1 through the connection 30.

A manhole 31 is provided in the shell to permit access to the interior of the shell.

What is claimed is:

1. In a feedwater heater, a shell having an inlet for steam and a storage space for heated water therein below said heating space, a circular partition within said shell inwardly of the steam inlet and forming a steam distribution space about its outer side and a feedwater heating space inwardly of its inner side, a wall closing the upper end of said steam circulating space whereby the steam will be directed downwardly along the outer side of the partition and across one end thereof into the heating space, means for spraying water to be heated upwardly through said heating space whereby the upwardly sprayed water will be caused to flow downwardly through the heating space to said storage space, and a splash plate spaced above said heating space, said splash plate comprising a flat plate and a plurality of depending ribs on the side of the flat plate engaged by the upwardly sprayed water, said flat plate and ribs forming a plurality of horizontal and vertical spaces to be contacted by the feedwater.

2. In a feedwater heater, a shell having an inlet for steam and a storage space for heated water therein below said heating space, a circular partition within said shell inwardly of the steam inlet and forming a steam distribution space about its outer side and a feedwater heating space inwardly of its inner side, a wall closing the upper end of said steam circulating space whereby the steam will be directed downwardly along the outer side of the partition and across one end thereof into the heating space, a feedwater inlet ring within the casing below said partition, a plurality of spray valves carried by said ring for spraying water to be heated upwardly through said heating space, said shell provided with a vent for non-condensable gases and vapor, a splash plate spaced above said heating space between the heating space and vent, said splash plate comprising a flat plate and a plurality of depending ribs forming a plurality of horizontal and vertical surfaces to be contacted by the feedwater, said circular partition being disposed eccentrically of the shell to provide an eccentric steam distribution space having its greatest cross-sectional area directly inwardly of the steam inlet.

3. In a feedwater heater, a shell having a water collection space in the bottom thereof and having a steam inlet above said water collection space, means in said shell forming a contact heating space, means for spraying water into and through said contact heating space in a direction approximately parallel with the directional flow of steam therethrough, means inwardly of the end of the shell and of larger area than the cross-sectional area of said contact space for directing the water in a return reverse direction through said contact space, means carried by said water directing means for breaking up the water flow and to cause the water to fall in broken streams in its reverse passage through the contact space, said shell provided with an outlet for air and non-condensed vapors, baffles in said shell for co-acting with said water directing means to provide a tortuous sinuous path for air and non-condensed vapors from said contact space to said outlet, said contact heating space forming means constructed and arranged to provide substantially equal velocity of steam entering the space at all points thereabout.

4. In a feedwater heater, a shell having a steam inlet and a contact heating space therein to which the steam flows, means for spraying water to be heated in one direction through said space, a splash plate for arresting the directional flow of the water after it is passed through the contact space whereby the water will return through said contact space in a reversed directional flow, and a plurality of depending ribs on said splash plate for breaking up the water into irregular streams for its reversed flow through the contact space.

5. In a feedwater heater, a shell having a water collection space in the bottom thereof and having a steam inlet above said water collection space, means spaced inwardly of the wall of said shell forming a contact heating space and an annular steam space surrounding said contact space, said steam inlet opening into said annular steam space, means for spraying water into and through said contact heating space in a direction approximately parallel with the directional flow of steam therethrough, means for arresting the directional flow of the water and breaking the water up into irregular streams whereby the water will return through said contact heating space in a direction reverse of the direction of steam flow through the space.

6. In a feedwater heater, a shell having a water collection space in the bottom thereof and having a steam inlet above said water collection space, means spaced inwardly of the wall of said shell forming a contact heating space and an annular steam space surrounding said contact space, said steam inlet opening into said annular steam space, means for spraying water into and through said contact heating space in a direction approximately parallel with the directional flow of steam therethrough, means for arresting the directional flow of the water and breaking the water up into irregular streams whereby the water will return through said contact heating space in a direction reverse of the direction of steam flow through the space, said contact heating space forming means constructed and arranged to force steam to enter the space from one end thereof only.

7. In a feedwater heater, a shell having a water collection space in the bottom thereof and having a steam inlet above said water collection space, means spaced inwardly of the wall of said shell forming a contact heating space and an annular steam space surrounding said contact space, said steam inlet opening into said annular steam space, means for spraying water into and through said contact heating space in a direction approximately parallel with the directional flow of steam therethrough, means for arresting the directional flow of the water and breaking the water up into irregular streams whereby the water will return through said contact heating space in a direction reverse of the direction of steam flow through the space, said contact heating space forming means constructed and arranged to force steam to enter the space from one end thereof only, said contact heating space forming means disposed relative to said shell to gradually decrease the cross-sectional area of the annular steam space progressively in both annular directions from the steam inlet to provide substantially equal velocity of steam entering the contact heating space at all points of the space.

JOSEPH F. SEBALD.